United States Patent [19]

Srinivasan

[11] Patent Number: 5,498,671
[45] Date of Patent: Mar. 12, 1996

[54] POLYOLEFIN COMPOSITIONS CONTAINING HIGH AND LOW MOLECULAR WEIGHT EPDM RUBBERS

[75] Inventor: Satchit Srinivasan, Carrollton, Tex.

[73] Assignee: D & S Plastic International, Grand Prairie, Tex.

[21] Appl. No.: 311,843

[22] Filed: Sep. 23, 1994

Related U.S. Application Data

[63] Continuation of Ser. No. 16,586, Feb. 10, 1993, abandoned.

[51] Int. Cl.⁶ .................. C08L 23/10; C08L 23/04; C08L 23/16
[52] U.S. Cl. .................. 525/240; 525/193; 525/211
[58] Field of Search .................. 525/240, 193, 525/97, 95, 211, 210

[56] References Cited

U.S. PATENT DOCUMENTS

| | | | |
|---|---|---|---|
| 4,536,547 | 8/1985 | Lundberg et al. | 525/186 |
| 4,843,128 | 6/1989 | Cesare | 525/193 |
| 5,011,891 | 4/1991 | Spenadel et al. | 525/240 |
| 5,162,441 | 11/1992 | Nakata et al. | 525/240 |
| 5,239,000 | 8/1993 | Kim et al. | 525/240 |

OTHER PUBLICATIONS

Rubber World Blue Book, Materials & Compounding Ingredients for Rubber, "Ethylene–Propylene–Diene Terpolymers (EPDM)", 1975, pp. 406–410

Primary Examiner—Paul R. Michl
Assistant Examiner—Mark L. Warzel
Attorney, Agent, or Firm—Pennie & Edmonds

[57] ABSTRACT

The present invention relates to polymer compositions having improved adhesion for coating materials. The compositions include 40–90% by weight of a polyolefin, 10–50% by weight of a first rubber component and 1–20% by weight of a second rubber component. The first rubber component is preferably an ethylene propylene diene rubber having a weight average molecular weight of 50,000 to 300,000, while the second rubber is an ethylene-propylene diene rubber having a number average molecular weight of about 2,000 to 10,000.

9 Claims, No Drawings

POLYOLEFIN COMPOSITIONS CONTAINING HIGH AND LOW MOLECULAR WEIGHT EPDM RUBBERS

This is a continuation, of application Ser. No. 08/016,586, filed Feb. 10, 1993, now abandoned.

FIELD OF THE INVENTION

The invention relates to thermoplastic compositions which have improved adherence for coating materials such as paints, and to compositions bearing those coating materials. The invention particularly relates to coated, polyolefin compositions which have improved resistance to petroleum fluids such as gasolines and the like.

BACKGROUND OF THE INVENTION

Polymer blends can be formed or shaped into lightweight and durable articles useful, for example, as automobile parts, toys, and housings for various types of equipment. Unfortunately, polymer blends such as those formed of polyethylene, polypropylene and rubber are difficult to treat so that the paint durably adheres to the surface of the article. Paint adhesion is a particular concern in the case of blends derived from thermoplastic olefin ("TPO") compositions such as those disclosed U.S. Pat. Nos. 4,480,065; 4,412,016 and 4,439,573.

TPO compositions are blends of synthetic rubber and polyolefins such as polypropylene and polyethylene. Because articles made from TPO compositions have gained acceptance in the automotive industry as body parts and the like, it is important that paint sufficiently adheres to the TPO composition to withstand petroleum fluids such as gasolines and the like.

Articles formed of TPO blends which contain substantial amounts of polypropylene exhibit poor adherence for coating paints. These compositions therefore must be treated prior to applying coating materials such as paints by the application of interlayer coatings to promote adhesion. Unfortunately, articles made from TPO compositions are difficult to treat so that the paint adheres against the action of petroleum fluids such as gasolines which dissolve the interlayer coatings. Many paints either do not adhere to the TPO composition, or peel or chip away under normal use, high humidity conditions, or in the presence of fuels or solvents.

Various methods have been tried to improve the adherence of TPO compositions having substantial amounts of polypropylene and/or rubber for paints. Methods of the art have employed primers or adhesion promoters such as chlorinated polyolefins, as well as surface treatments. Although these methods have improved the adherence of these compositions for coating materials such as paints, these methods have not been entirely satisfactory. For example, adhesion promoters such as chlorinated olefins are suspectable to attack by petroleum fluids such as gasolines. Also, the prior art methods for increasing adherence of polymer compositions are costly and time consuming.

A need therefore exists for polymer compositions that show improved adherence for coatings such as paints to enable manufacture of coated polymer compositions which show improved resistance to attack by fluids.

SUMMARY OF THE INVENTION

Thermoplastic olefin compositions having improved fluid resistance when painted with flexible coatings such as polyurethanes paints, and the like are disclosed. These compositions include a thermoplastic olefin such as crystalline polypropylene, crystalline polyethylene or mixtures thereof with a first rubber component of an ethylene propylene diene rubber having a high molecular weight and a second rubber component of an ethylene propylene diene rubber having a low molecular weight, wherein the first rubber component has a molecular weight of 4 to 200 times that of the second rubber component.

The invention is directed to polymer blends having improved adhesion to coating materials, their methods of manufacture, and to coated polymer blends which have improved resistance to fluids. In accordance with the invention, polymer blends having improved adherence for coating materials such as paints are provided. These blends comprise 90–40% of an olefin component, between 10% and 50% by weight of a first rubber component of a high molecular weight ethylene-propylene-diene, and between 1 and 20% by weight of a second rubber component of a low molecular weight ethylene-propylene-diene, wherein the molecular weight of the first component is between about 4 to 200 times that of the second component. The first and second rubber components may be present in a weight ratio of between 3:1 and 5:1 of first polymer to second polymer. The olefin component may comprise crystalline polypropylene or crystalline polyethylene. Preferably, the molecular weight of the first rubber component is about 4 to 200 times that of the second rubber component.

The first rubber component may have a weight average molecular weight of between 50,000 and 300,000, and the second rubber component may have a number average molecular weight of between 2,000 and 10,000. Useful high molecular weight rubbers include ethylene-propylene-dicyclopentadiene and the like. Useful low molecular weight rubbers include ethylene-propylene-ethylidene-norbornene ("ENB") and the like. The first and second rubber components are utilized in a weight ratio of between 2:1 and 10:1. The ethylene-propylene-diene rubbers have a diene content of at least 7%, usually 10% or greater.

In a further embodiment of the invention, the polymer blends can include an agent for compatibilizing the olefin component with the first and second ethylene-propylene-diene rubber components. The compatibilizing agent can be a copolymer of polypropylene with a polar compound. Useful compatibilizing agents may include copolymers of polypropylene with any of polystyrene, polyester, polyurethane, acrylic compounds, or mixtures thereof. These compatibilizing agents typically have a number average molecular weight below 100,000. Particularly useful compatibilizing agents include copolymers of polypropylene with polystyrene-co-acrylonitrile, especially copolymers of polypropylene polystyrene-co-acrylonitrile grafted with carboxylic acid anhydrides and polypropylene grafted in styrene-co-hydroxypropyl methacrylate. Useful carboxylic anhydrides include phthalic anhydride, particularly maleic anhydride.

Having briefly summarized the invention, the invention will now be described in detail by reference to the following specification and non-limiting examples. Unless otherwise specified, all percentages are by weight and all temperatures are in degrees Celsius.

DETAILED DESCRIPTION OF THE INVENTION

Conventional polypropylenes can be employed as the olefin component in the polymer blends of the invention.

These may be blended with polyethylenes, if desired. Copolymers of propylene and ethylene also may be used as the olefin component. When a copolymer of propylene and ethylene is utilized, the copolymer either can be in the form of a random copolymer, a block copolymer, or a graft copolymer. The crystallinity of the olefin component can vary from substantially amorphous to partially crystalline. When polypropylene is used as the olefin component, the polypropylene has 10–98% crystallinity, preferably 30–90% crystallinity, as determined by X-ray analysis or solvent extraction.

The ethylene-propylene-diene rubber components may constitute up to about 60% of the compositions of the invention. The amounts of the first and second ethylene-propylene-diene rubbers may individually constitute 10 to 50 and 1 to 20 weight percent, respectively, of the compositions of the invention. In these ethylene-propylene-diene rubber components, the ethylene content can be 20 to 80 mole percent of the rubber, polypropylene can be 20 to 80 mole percent of the rubber, and diene can be from 2–20 mole percent of the rubber. Useful dienes include, but are not limited to, those having between about 4 to 15 carbons.

The diene rubber components employed in the blends of the invention may be any rubber that is compatible or may be rendered compatible with the other ingredients of the blend. The term "compatible" is intended to mean that when the components of the blend are combined, the resultant blend can be molded, extruded or otherwise formed or shaped into commercially useful articles. The primary requirements are that the diene rubber has sufficiently low viscosity so that it can be dispersed into the blend. Fillers and coupling agents may be used to render chemically dissimilar components sufficiently compatible to be suitable in many cases.

Diene rubber materials which offer an excellent compromise of cost and performance are ethylene-propylene-diene rubbers and styrene-butadiene rubbers. Other useful rubber materials include polymers containing 1,4-butadiene, isoprene, 1,4-hexadiene, ethylidene-norbornene and copolymers of ethylene-propylene with these diene rubbers. Examples of useful rubbers are terpolymers of ethylene, propylene with dicyclopentadiene as well as terpolymers of ethylene, propylene with ethylidene-norbornene. Useful high molecular weight diene rubbers include ethylene-propylene-dicyclopentadiene and the like. Useful low molecular weight rubbers include ethylene-propylene-ethylidene-norbornene. Less preferred but also suitable are polyisoprene, bromobutyl rubber, and nitrile rubber. Combinations of these hydrocarbons and copolymers also can be used.

The following is a list of other rubber materials which may be employed in the invention:

| Name | Type | Supplier |
| --- | --- | --- |
| Polysar xG006 | Ethylene-Propylene-ENB | Polysar |
| Nordel 2722 | Ethylene-Propylene-Hexadiene | DuPont |
| Nordel 1320 | Ethylene-Propylene-diene | |
| Vistalon 2504 | Ethylene-Propylene-diene | Exxon |
| Kraton G 11650 | Styrene-Ethylene-Butadiene Styrene | Shell |
| Stereon 840 A | Styrene-Butadiene | Firestone |
| GE 7340 | Hydrogenated Styrene-Butadiene | Goldsmith & Eggleton |
| Natsyn 220 | Polyisoprene | Goodyear |
| Dutral TER 4334 | Ethylene-Propylene-diene | Enichem |

The blends of the invention can further comprise an agent for compatibilizing the olefin component with the first and second ethylene-propylene-diene rubber components. Compatibilizing agents typically have a molecular weight below about 100,000. The compatibilizing agent can be a copolymer of polypropylene with a polar compound such as polystyrene, polyester, polyurethane, an acrylic compound, or a mixture thereof. Useful compatibilizing agents include well-known copolymers of polystyrene-co-acrylonitrile. Particularly useful compatibilizing agents include commercially available copolymers of polystyrene-co-acrylonitrile grafted with maleic anhydride, and commercially available copolymers of polypropylene grafted with poly(styrene-hydroxy propylmethacrylate).

It is known that paints adhere to polymer blends through the use of an adhesion promoter. In conventional polymer blends, a crystalline material such as polypropylene is mixed with an ethylene propylene rubber component. The rubber particles present on the surface of an article molded from the blend provide sites to which the adhesion promoter can bond. The surface morphology of these molded articles shows the rubber particles as "islands" in a "sea" of the crystalline material. Thus, the adhesion promoter bonds with these islands and bridges between adjacent islands.

Without wishing to be bound by theory, it is believed that in the present invention, that the use of both high and low molecular weight ethylene propylene diene rubber components provides an enhanced surface morphology, with many more "islands" to which the adhesion promoter can attach, while providing shorter bridges between islands. This provides a more secure bond for the adhesion promoter and thus a surface which is more receptive to paint and which bonds more strongly thereto. In addition, it is believed that these terpolymer rubbers provide a stronger bond between the adhesion promoter and the rubber, possibly due to the enhanced permeability of the terpolymers.

The polymer blends of the invention have excellent paintability, a broad range of stiffness values, as well as high impact and tensile strengths which make them suitable for automotive applications. The polymer compositions of the invention can be molded or otherwise formed or shaped to produce articles that are lightweight, durable, and have surfaces that are paint receptive. The articles can be treated with an adhesion promoter and then painted, and the paint cured at temperatures exceeding 80° C. to produce a durable and attractive finish. Any of the conventional adhesion promoters can be used with good results.

The polymer blends of the invention can be coated with paints, particularly with paints such as commercially available two-component polyurethanes, to provide products with superior fluid resistance. The blends of the invention also may be coated with paints which have active functional groups such as acrylics, polyesters, epoxy resins, carbodimides, urea resins, melamine-formaldehyde resins, enamines, ketimines, amines, and isocyanates to provide products with improved fluid resistance. These types of paints are well known in the paint and coatings industry.

Various additives can be incorporated into the polymer blends of the invention to vary the physical properties of the blends of the invention while retaining good paint adhesion. These additives may include pigments, dyes, processing aids, antistatic additives, surfactants and stabilizers such as those which generally are used in polymeric compositions. Particularly useful additives may include styrene-maleic anhydride copolymers and cationic surfactants for improving moisture resistance, and well known copolymers such as ethylene-acrylic acid copolymers ("EAA") and ethylene-methacrylic acid copolymers ("EMAA"), or mixtures or blends thereof.

The fluid resistance of preforms of the polymer blends of the invention bearing a single coating of 2-part commercially available polyurethane is evaluated by placing the coated preforms into a gasoline bath. The gasoline bath may be mixtures of any of 90% unleaded gasoline and 10% ethanol; 90% unleaded gasoline and 10% methanol; or 100% unleaded gasoline. The preforms employed are 2½" squares, or possibly 1"×3" bars. The coated preform remains immersed in the gasoline bath until failure, that is, paint at the edges of the preform curls away from the preform. The coated preform then is removed from the bath and the time to failure recorded. The fluid resistance of the coated preforms are shown in Table I.

The % peel of the paint from the preform also is a measure of the ability of the preform to retain paint against the action of petroleum fluids such as gasoline. The painted preform is removed from the gasoline bath after a 30-minute immersion and measuring the area, if any, that is free of paint. The % peel is determined by dividing the area of the preform free of paint by the original painted area of the preform. Low % peel is desired.

The invention will now be described by reference to the following non-limiting examples.

EXAMPLES 1–11

The blends of Examples 1–11 are formed by blending the components in the amounts given in Table I. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with a single layer of paint of two-part polyurethanes in accordance with well known methods such as spraying. The polymer blends also can be pelletized for storage and shipment prior to molding into shaped articles.

TABLE I

| COMPONENT (%) | EX 1 | EX 2 | EX 3 | EX 4 | EX 5 | EX 6 | EX 7 | EX 8 | EX 9 | EX 10 | EX 11 |
|---|---|---|---|---|---|---|---|---|---|---|---|
| Polypropylene[1] | 70 | 65 | 60 | 60 | 60 | 60 | 60 | 60 | 60 | 55 | 60 |
| TER (EPDM)-E[2] | 20 | 25 | 30 | 30 | 30 | 30 | 30 | 30 | | | |
| T-CP80[3] | | | | 10 | | | | | | | |
| T-68-ENB[4] | | | | | 10 | | | | | | |
| T-65-DCPD[5] | | | | | | | | 10 | | | |
| T-55-DCPD[6] | 10 | 10 | 5 | | | | | 10 | 10 | 5 | 5 |
| T-67-ENB[7] | | | | | | 10 | | | | | |
| Ter-EPDM[8] | | | | | | | | | 20 | 35 | 30 |
| A3500[9] | | | | | | | | | 10 | 5 | 5 |
| Gasoline Resistance[10] | >30 | >30 | >30 | 20 | 23 | 25 | 25 | 60 | >150 | >90 | >30 |
| % PEEL[11] | 0 | 0 | 0 | <7 | <5 | <5 | <5 | 0 | 0 | 0 | 0 |

Notes:
[1]Polypropylene of MW >100,000
[2]Ter polymer of ethylene - propylene - diene Mooney Viscosity of 45 ($ML_{1+4}$, 100° C.); ROYALENE 521 from Uniroyal Chemical Co.
[3]Low molecular weight ethylene - propylene copolymer
[4]Ethylene-propylene-[ethylidene-norbornene] with C2:C3 of 45:55 from Uniroyal Chemical Co.
[5]10% ter of Dicyclopentadiene with a $C_2:C_3$ = 48:52, Mn = 7000, available from Uniroyal Chemical Co.
[6]13% ter of Dicyclopentadiene with a $C_2:C_3$ = 49:51, Mn = 5200, available from Uniroyal Chemical Co.
[7]9% ter of Ethylene nobornene with $C_2:C_3$ of 46:54, Mn = 7500, available from Uniroyal Chemical Co.
[8]Ethylene propylene diene terpolymer available from Uniroyal Chemical Co.
[9]Graft copolymer of polypropylene with poly(styrene-hydroxypropylmethacrylate) from Nippon Oil and Fat Co.
[10]Minutes to failure; gasoline bath of 90% unleaded gasoline and 10% ethanol.
[11]% peel at 30 minutes

COMPARISON EXAMPLES 12–16

Comparison examples 12–16 are produced in the same manner as Examples 1–11 except that the first and second ethylene-propylene-diene rubbers are not employed. The compositions and the fluid resistance of these comparative examples is shown in Table II.

TABLE II

| COMPONENT (%) | EX. 12 | EX. 13 | EX. 14 | EX. 15 | EX. 16 |
|---|---|---|---|---|---|
| POLYPROPYLENE[1] | 70 | 70 | 70 | 70 | 70 |
| ETHYLENE-PROPYLENE COPOLYMER[2] | 30 | | | | |
| ETHYLENE-PROPYLENE COPOLYMER[3] | | 30 | | | |
| ETHYLENE-PROPYLENE COPOLYMER[4] | | | 30 | | |
| ETHYLENE-PROPYLENE COPOLYMER[5] | | | | 30 | |
| ETHYLENE-PROPYLENE COPOLYMER[6] | | | | | 30 |
| GASOLINE RESISTANCE[7] | 5 | 7 | 11 | <10 | 12 |
| % PEEL[8] | >90 | >90 | >90 | >90 | >90 |

[1]Polypropylene of molecular weight of more than 100,000
[2]Ethylene-propylene copolymer of 72% ethylene, 28% polypropylene, MW = 70,000
[3]Ethylene-propylene copolymer of 72% ethylene, 28% polypropylene, MW = 50,000
[4]Ethylene-propylene copolymer of 76% ethylene, 24% polypropylene, MW = 50,000
[5]Ethylene-propylene copolymer of 76% ethylene, 24% polypropylene, MW = 50,000
[6]Ethylene-propylene copolymer of 76% ethylene, 24% polypropylene, MW = 50,000

TABLE II-continued

| COMPONENT (%) | EX. 12 | EX. 13 | EX. 14 | EX. 15 | EX. 16 |
|---|---|---|---|---|---|

[7] Minutes to failure; gasoline bath of 90% unleaded gasoline and 10% ethanol
[8] % peel at 30 minutes Upon reviewing the data, it is seen that both the high and low molecular weight EPD rubbers are present to obtain enhanced paint bonding to the molded polymer blend. The best results are achieved when a compatibilizing agent is used, as shown by components Ex. 9–11 of Table I. Also, better gasoline resistance is attained when a lower molecular weight EPD rubber component having a relatively higher diene content is employed.

Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

What is claimed is:

1. A polymer composition having improved adhesion for coating materials consisting essentially of about 40–90% of an olefin component of polypropylene, polyethylene, a copolymer of propylene and ethylene, or a mixture thereof, about 10% to 50% by weight of the composition of a first rubber component of an ethylene-propylene diene rubber having a weight average molecular weight of between about 50,000 and 300,000 and about 1 to 20% by weight of a second rubber component of an ethylene-propylene diene rubber having a number average molecular weight of about 2,000 to 10,000.

2. The composition of claim 1 wherein the first and second rubber components are present in a weight ratio of between about 2:1 and 10:1, and the number average molecular weight of the second rubber is about 5,000 to 7,000.

3. The composition of claim 2 wherein the second rubber component has a diene content of at least about 7%.

4. The composition of claim 3 wherein the second rubber component has a diene content of at least about 10% and wherein the weight ratio of the first rubber component to the second rubber component is between about 3:1 and 5:1.

5. The composition of claim 1 wherein the olefin component comprises crystalline or semi-crystalline polyethylene, crystalline or semi-crystalline polypropylene or mixtures thereof.

6. The composition of claim 1 wherein the first rubber component is ethylene-propylene ethylidene-norbornene and the second rubber component is ethylene-propylene-dicyclopentadiene.

7. The composition of claim 1 wherein the weight average molecular weight of the first rubber component is about 4 to 200 times the number average molecular weight of the second rubber component.

8. The composition of claim 1 wherein the first and second rubber components are utilized in a weight ratio of between about 2:1 and 6:1.

9. The composition of claim 1 wherein the second rubber component has a diene content of at least about 10% and the weight ratio of the first rubber component to the second rubber component is between about 3:1 and 5:1.

* * * * *